United States Patent [19]
Van Den Herik

[11] Patent Number: 5,315,216
[45] Date of Patent: May 24, 1994

[54] TELEVISION PICTURE DISPLAY DEVICE AND CIRCUIT FOR HORIZONTAL DEFLECTION IN SUCH A TELEVISION PICTURE DISPLAY DEVICE

[75] Inventor: Florus B. Van Den Herik, Oosterhout, Netherlands

[73] Assignee: U.S. Philips Corporation, New York, N.Y.

[21] Appl. No.: 991,819

[22] Filed: Dec. 17, 1992

[30] Foreign Application Priority Data

Dec. 21, 1991 [DE] Fed. Rep. of Germany ....... 4142651

[51] Int. Cl.[5] .................................................. G09G 1/04
[52] U.S. Cl. .................................................. 315/370
[58] Field of Search ............... 315/370, 371; 361/281, 361/293

[56] References Cited

U.S. PATENT DOCUMENTS

| | | | |
|---|---|---|---|
| 2,989,671 | 6/1961 | Barnes | 361/281 |
| 2,991,371 | 7/1961 | Lehovac | 361/281 |
| 4,429,257 | 1/1984 | Haferl | 315/371 |
| 4,516,169 | 5/1985 | Truskalo | 358/190 |
| 4,533,855 | 8/1985 | Willis et al. | 315/370 |
| 4,719,627 | 12/1979 | Reitz | 307/261 |
| 4,761,586 | 8/1988 | Wharton | 315/408 |
| 4,789,811 | 12/1988 | Hulshof | 315/371 |
| 4,859,915 | 8/1989 | Decraemer | 315/371 |
| 4,935,675 | 6/1990 | Ochiai | 315/371 |

FOREIGN PATENT DOCUMENTS

| | | |
|---|---|---|
| 0146345 | 12/1984 | European Pat. Off. . |
| 2724552 | 12/1978 | Fed. Rep. of Germany ...... 315/371 |
| 3419930 | 11/1984 | Fed. Rep. of Germany . |

Primary Examiner—Gregory C. Issing
Attorney, Agent, or Firm—Edward W. Goodman

[57] ABSTRACT

A circuit for horizontal deflection in television picture display devices is described, in which a capacitor for correcting the tangential error by means of an S-shaped distortion of the deflection current is arranged in series with the horizontal deflection coil. This capacitor includes a series arrangement of two sub-capacitors (4, 5) of corresponding capacitance, at least the capacitor (5) which is not directly connected to the horizontal deflection coil (1) having a dielectric which is dependent on the direct voltage, and the junction point (6) of these two capacitors (4, 5) conveys a variable direct voltage.

4 Claims, 1 Drawing Sheet

TELEVISION PICTURE DISPLAY DEVICE AND CIRCUIT FOR HORIZONTAL DEFLECTION IN SUCH A TELEVISION PICTURE DISPLAY DEVICE

BACKGROUND OF THE INVENTION

1. Field of the Invention

The invention relates to a circuit for horizontal deflection in television picture display devices, including a capacitor arranged in series with the horizontal deflection coil for correcting the tangential error by means of an S-shaped distortion of the deflection current, and to a picture display device including such a circuit.

2. Description of the Related Art

It is known that the geometry of display tubes gives rise to a non-linear distortion of the scanning raster proximate to the beginning and the end of the horizontal scanning line. To correct this non-linearity, a capacitor is normally arranged in series with the horizontal deflection coils. This S correction capacitor used for correcting the tangential error is charged during a part of the horizontal deflection interval and is discharged during another part so that the horizontal deflection current is S-shape modified and the deflection is performed linearly.

In order to achieve a desired extent of S formation at different values, i.e. deflection frequencies, it is known (for example, from DE 34 19 930, corresponding to U.S. Pat. No. 4,516,169) to connect a further capacitor optionally in series or in parallel with this S correction capacitor. Moreover, it is known from EP 0 146 345, corresponding to U.S. Pat. No. 4,533,855, that an improvement of the S correction in display tubes having very large deflection angles or complex display screen shapes can be achieved by temporarily adding a further capacitor during the horizontal or vertical deflection. A drawback thereof is that a circuit should be additionally provided for connecting and disconnecting the further capacitor.

SUMMARY OF THE INVENTION

It is therefore an object of the present invention to provide an improved circuit for the horizontal deflection with a steplessly adjustable S correction of the deflection current, in which capacitors need neither be interchanged, nor in which additional capacitors are required.

This object is solved by the circuit described in the opening paragraph, characterized in that said capacitor comprises a series arrangement of two sub-capacitors of corresponding capacitance, at least the capacitor which is not directly connected to the horizontal deflection coil having a dielectric which is dependent on the direct voltage, and in that the junction point of said two capacitors conveys a variable direct voltage.

The circuit according to the invention, has the advantage that the different S shapes of the deflection currents can be generated in multi-standard television picture display devices. A further advantage is that the use of different display screen dimensions does not require a modification of the circuit.

BRIEF DESCRIPTION OF THE DRAWING

These and other aspects of the invention will be apparent from and elucidated with reference to the embodiments described hereinafter. In the drawings

DESCRIPTION OF THE PREFERRED EMBODIMENT

Figure 1:
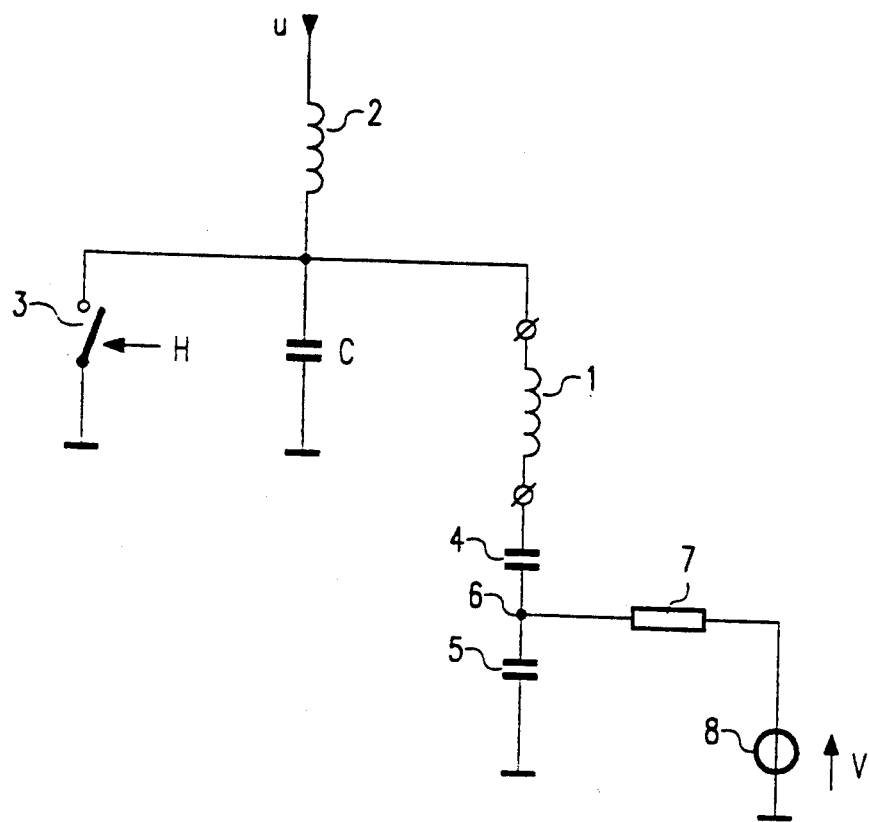
FIG. 1 shows a horizontal deflection circuit according to the invention.

FIG. 1 shows only those parts of a horizontal deflection circuit for television display devices which are required to explain the invention. A current is supplied from the power supply source U via a coil 2 to the horizontal deflection coil 1. In the deflection coil 1 a deflection current of horizontal frequency is generated by horizontal frequency control of a switch 3 in connection with a retrace capacitor C.

For S distortion of the horizontal deflection current a series arrangement of two sub-capacitors 4 and 5 is connected to ground, in series with the horizontal deflection coil 1. These two sub-capacitors 4 and 5 have a capacitance of one S correction capacitor for normal or conventional deflection frequencies. According to the invention, at least the sub-capacitor 5 has a dielectric which is dependent on an applied direct voltage. An adjustable DC source 8 is connected via a resistor 7 to the junction point 6 of these sub-capacitors 4 and 5. When the direct voltage supplied by the source 8 changes, the capacitance of the sub-capacitor 5 also changes. The sub-capacitor 5 may be in accordance with, for example Ceramic Multilayer Capacitors X7R of Philips. Both of the two sub-capacitors 4 and 5 may of course also have a dielectrics which are dependent on the direct voltage so that the capacitances of both sub-capacitors change when the voltage changes. To obtain any desired capacitor value, it is of course also possible to connect sub-capacitors of different values and with a voltage-dependent dielectric in parallel. This provides the possibility of simply adapting the S distortion by an adjustable change of capacitance to any desired use for the horizontal deflection.

Figure 2:
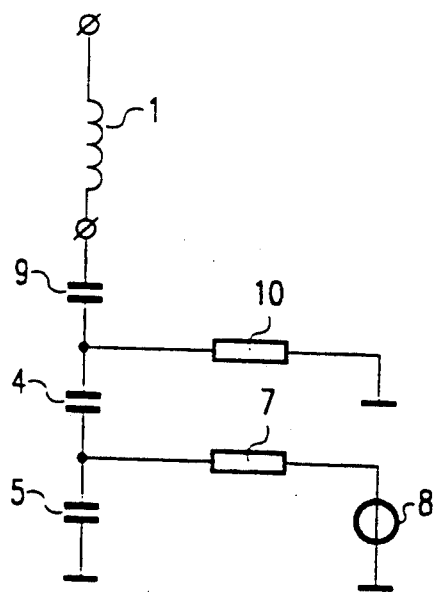
FIG. 2 shows a modification of the invention.

As is shown in FIG. 2, it is also possible to arrange a further—not necessarily voltage-dependent—capacitor 9 between the capacitor 4 and the deflection coil 1 in series with the sub-capacitors 4 and 5 having a direct voltage-dependent dielectric, while the junction point of the capacitors 4 and 9 is connected to ground via a resistor 10. It is thereby achieved that the capacitors 4 and 5 convey the same voltage so that unwanted distortions are reduced or eliminated.

I claim:

1. A circuit for horizontal deflection in television picture display devices, said circuit including at least a horizontal deflection coil and a capacitor arranged in series with the horizontal deflection coil for correcting a tangential error in a display of a television picture display device by means of an S-shaped distortion of a deflection current applied to the horizontal deflection coil, characterized in that said capacitor comprises a series arrangement of two sub-capacitors of corresponding capacitance, at least the sub-capacitor which is not directly connected to the horizontal deflection coil having a dielectric which is dependent on an applied direct voltage, and in that said circuit further comprises means for applying a variable direct current to a junction point of said two sub-capacitors.

2. A circuit as claimed in claim 1, characterized in that a further capacitor is arranged between the horizontal deflection coil and the series arrangement of said two sub-capacitors, and in that a junction point between the further capacitor and the series arrangement is connected to a reference potential via a resistor (10).

3. A picture display device comprising a cathode ray tube and a deflection unit including a horizontal deflection coil, and having a circuit for deflecting an electron beam horizontally, said circuit including a capacitor arranged in series with the horizontal deflection coil for correcting a tangential error in a display of said cathode ray tube by means of an S-shaped distortion of a deflection current applied to the horizontal deflection coil, characterized in that said capacitor comprises a series arrangement of two sub-capacitors of corresponding capacitance, at least the sub-capacitor which is not directly connected to the horizontal deflection coil having a dielectric which is dependent on an applied direct voltage, and in that the circuit further comprises means for applying a variable direct current to a junction point of said two sub-capacitors.

4. A display device as claimed in claim 3, characterized in that a further capacitor is arranged between the horizontal deflection coil and the series arrangement of said two sub-capacitors, and in that a junction point between the further capacitor and the series arrangement is connected to a reference potential via a resistor (10).

* * * * *